United States Patent [19]

Calkins et al.

[11] 3,946,982

[45] Mar. 30, 1976

[54] ADJUSTABLE MOLD FOR DIRECT CASTING OF PLASTIC MULTIFOCAL LENSES

[75] Inventors: Tracy H. Calkins; Frank E. Duckwall, both of Tampa, Fla.

[73] Assignee: Textron, Inc., Tampa, Fla.

[22] Filed: Sept. 3, 1974

[21] Appl. No.: 502,562

[52] U.S. Cl. .............. 249/102; 249/155; 249/159; 425/808
[51] Int. Cl.² ........................................ B29D 11/00
[58] Field of Search ........... 425/808; 249/102, 155, 249/157, 159

[56] References Cited
UNITED STATES PATENTS

| | | | |
|---|---|---|---|
| 3,056,166 | 10/1962 | Weinberg | 249/102 |
| 3,297,422 | 1/1967 | Emerson et al. | 425/808 X |
| 3,460,928 | 8/1969 | Casko | 425/808 X |
| 3,555,611 | 1/1971 | Reiterman | 425/808 X |
| 3,605,195 | 8/1970 | Campbell | 425/808 X |
| 3,674,587 | 7/1972 | Laliberte | 425/808 |

*Primary Examiner*—Ronald J. Shore
*Assistant Examiner*—Gus T. Hampilos
*Attorney, Agent, or Firm*—Charles B. Smith; Gary A. Walpert

[57] ABSTRACT

Apparatus for finish casting of bifocal ophthalmic lenses from plastic material is described. No further surface grinding or polishing of the lens is required. The portion of the bifocal segment of the lens may be adjusted to any desired location relative to the optical center of the distance field of the lens. The apparatus comprises a power mold having a predetermined spherical or sphero-cylindrical surface, a bifocal mold having a predetermined optical curvature with a bifocal segment having a different optical curvature countersunk in the face thereof, and an annular gasket coupling the power and bifocal molds. The bifocal segment is adjusted relative to the optical center of the cast lens by use of a wedge member. An illustrative calculation to determine placement and thickness of the wedge for a given ophthalmic prescription is set forth. Alternative means for adjusting the bifocal segment by sliding the assembled power mold and gasket relative to the bifocal mold is also described, as is a means for introducing corrective prism into a cast lens.

26 Claims, 19 Drawing Figures

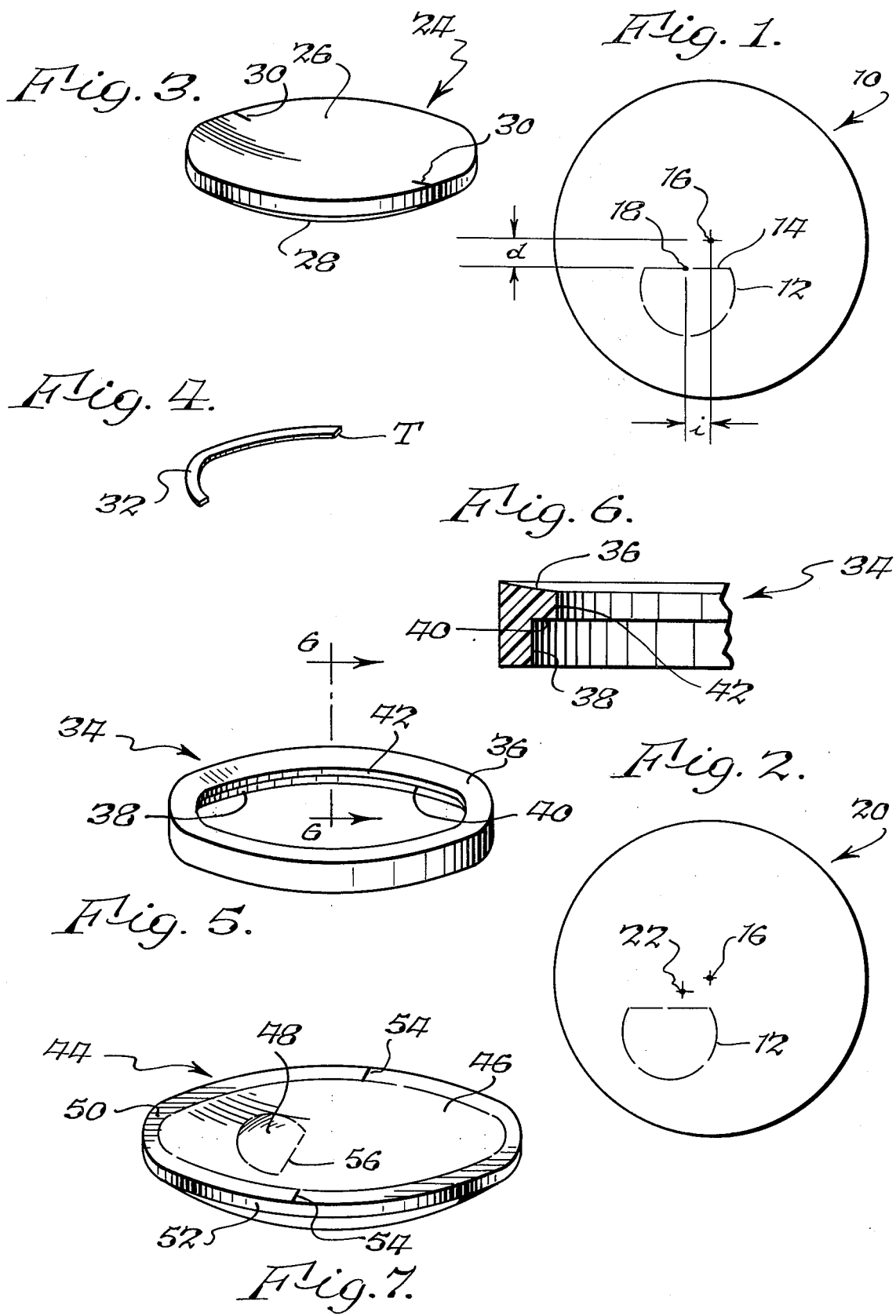

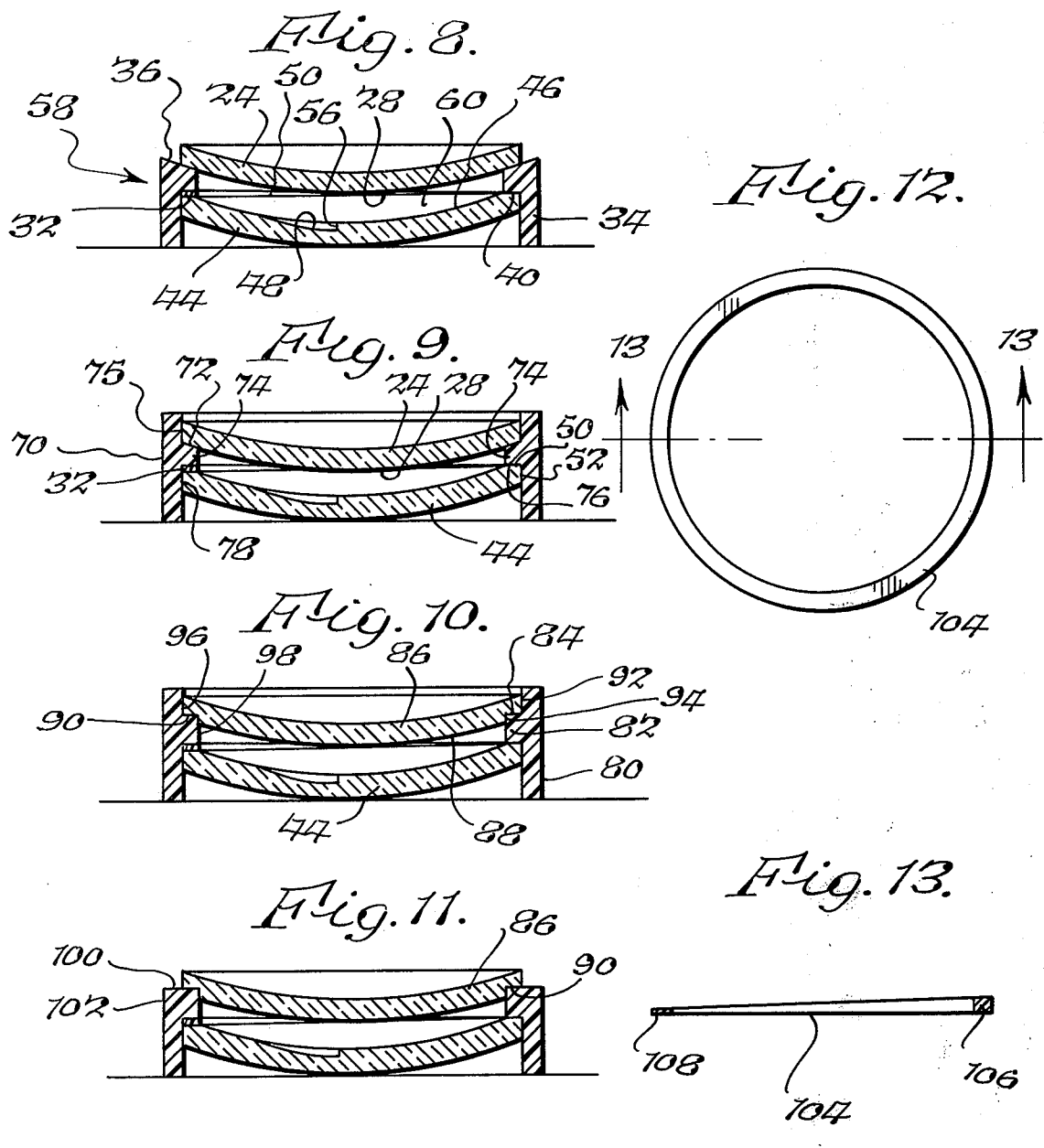

ADJUSTABLE MOLD FOR DIRECT CASTING OF PLASTIC MULTIFOCAL LENSES

This invention relates to new and improved methods for casting uncut finished multifocal ophthalmic lenses out of plastic material as described by prescription.

BACKGROUND OF THE INVENTION

For some time, plastic materials have been successfully cast into single vision lenses, usually in some definite diameter and thickness. Such castings are referred to as uncuts. These are finished by edging to size and shape in a prescription laboratory.

When the uncuts are obtained by grinding and polishing from semifinished plastic castings, i.e., castings requiring grinding and polishing on one side, inferior lenses result due to the physical instability of the casting during processing. Plastic does not polish as readily as glass and many steps of processing are required to get a satisfactory optical surface, the final step usually being performed with a velour type pad. The laboratory thus experiences high costs and the patient gets inferior lenses. As a result most single vision plastic lenses are provided in the uncut cast form, requiring only edging to size and shape.

When it is desired, using known techniques, to provide bifocals made out of plastic, the requirement of the bifocal addition makes the ability to supply uncuts as stock items virtually impossible because of the millions of combinations necessary to meet prescriptive requirements. Heretofore, when a plastic bifocal lens was desired, one procedure was to supply the optician with semifinished blanks from which he ground and polished the uncuts with the inferior results and high costs referred to. A satisfactory method of casting uncut bifocals out of plastic which would require no additional grinding or polishing of the optical surfaces, has, therefore, long been desirable.

One of the known techniques of finish casting multifocal plastic lenses is described in U.S. Pat. No. 3,056,166 to Weinberg. It discloses the making of a finished cast plastic lens by using a pair of mold parts coupled together by an annular gasket. When a bifocal addition is reqquired, Weinberg states that a mold part containing the proper bifocal addition at the proper location in the surface thereof is selected as one of the mold parts, and that a corresponding gasket is also selected. Where it is desired to introduce corrective prism into the lens, Weinberg states that it is necessary to cut the gasket by a specially constructed device. Thus, using the techniques described by Weinberg for the direct casting of finished bifocal plastic lenses is cumbersome and uneconomic as it requires carrying an inventory of a very large number of bifocal molds and gaskets and also requires operating a special machine tool at or near the casting station.

It is therefore an object of the present invention to provide a means for the inexpensive casting of high quality multifocal lenses from plastic material, wherein no further grinding or polishing operations of the optical surfaces are required.

It is a further object of the invention to provide a means for providing such lenses using a limited and manageable number of mold and gasket parts.

It is a still further object of the present invention to provide a simplified and inexpensive means to position the bifocal addition a predetermined distance from the optical center of the distance field, as may be required by the prescription involved.

It is another object of the present invention to provide a simple and inexpensive means of introducing corrective prism into a cast multifocal lens.

SUMMARY OF THE INVENTION

To cast plastic bifocals accordring to prescriptions, a method and apparatus must be used that will produce a finished lens, except for edging (referred to as an "uncut") which has the proper spherical and cylindrical power, prescribed axis of the cylinder, suitable size, good location of the optical center so the final lens shape may be edged out, proper thickness, and a reading bifocal segment of desired size, shape and location with respect to the optical center of the main lens (distance portion).

The general method of casting a bifocal uncut is first to provide a mold generally made out of glass with a spherical or sphero-cylindrical surface of designated value. Such mold is referred to hereafter as a "power" mold. Secondly, to provide a mold generally made out of glass or metal which has two curves of different radii ground and polished in one surface. The difference between the two curves produces the addition or bifocal. This is referred to as the "bifocal" mold. A mold having three different radii in the same surface will, of course, produce a trifocal. Thirdly, some means of combining the two molds must be provided so that thickness of the lens and cylinder axis may be controlled as desired. This is generally accomplished by means of a plastic ring called a gasket, and an orienting device calibrated in degrees. In addition some means must be used in order to locate the bifocal segment at the proper location with respect to the optical center of the finished lens. To accomplish this the present invention utilizes a wedge-shaped member to be more fully described hereinafter. Alternatively, an oversized bifocal mold may be employed and the power mold and gasket may be moved relative to the concave surface of the bifocal mold to place the bifocal segment at the desired location.

When the gasket, power mold, bifocal mold and wedge have been oriented with respect to each other, the assembly may be held together by conventional clamping means. A thermosetting plastic material is then introduced into the mold cavity formed thereby. The filled mold is secured by the application of pressure adequate to maintain the configuration of the cavity and the plastic material is subjected to heating and curing as known in the art.

Following curing, the finished plastic lens having the desired optical quality surfaces and powers as required by the prescription is removed from the gasket by conventional means. The lens is then ready to be edged and mounted in an eyeglass frame in the usual manner without further grinding or polishing of the optical surfaces.

BRIEF DESCRIPTION OF THE DRAWINGS

FIG. 1 is a plan view of an uncut bifocal lens showing a bifocal segment and wherein the optical and geometric or mechanical center of the lens have the same location.

FIG. 2 is a plan view of another uncut bifocal lens wherein the optical center of the distance field has been shifted away from the geometric center.

FIG. 3 is a perspective view of a power mold.

FIG. 4 is a perspective view of one form of wedge member.

FIG. 5 is a perspective view of one form of gasket.

FIG. 6 is a partial sectional view taken on lines 6—6 of FIG. 5.

FIG. 7 is a perspective view of a bifocal mold with a bifocal addition ground into the concave surface thereof.

FIG. 8 is a vertical sectional view of a mold assembly.

FIGS. 9, 10 and 11 are vertical sectional views of a mold assembly showing a modified form of gasket and power mold.

FIG. 12 is a plan view of a modified form of wedge member.

FIG. 13 is a sectional view taken on line 13—13 of FIG. 12.

DETAILED DESCRIPTION

Figure 14:
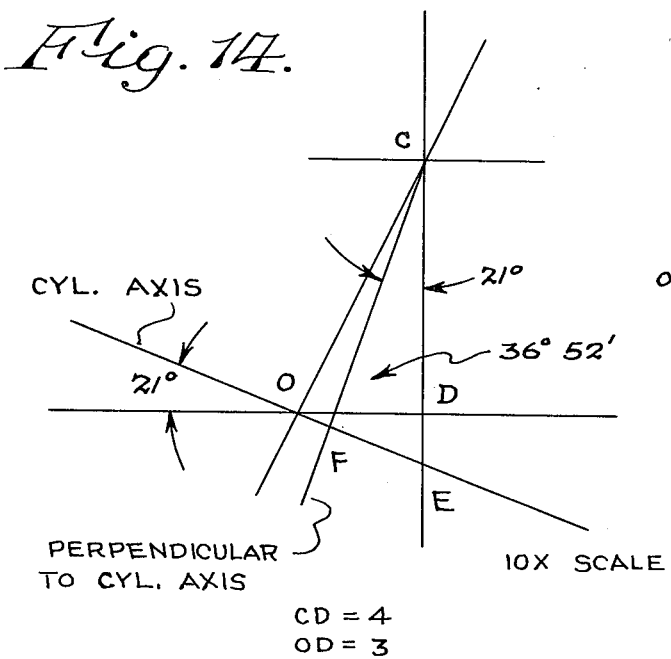
FIG. 14 is a diagram used to illustrate the manner in which the thickness and placement of a wedge member is used in connection with the present invention.

Referring now more particularly to the drawings, FIG. 1 illustrates an uncut bifocal lens generally designated 10 having a "D" shaped bifocal segment 12. Prior to the present invention one manner of making a finished plastic bifocal lens was to use a mold assembly in which the bifocal addition was cut into the surface of a circular bifocal mold at a predetermined distance down and in from the geometric center of the circular mold. On casting the lens this resulted in the bifocal segment 12 being located at the predetermined down and in position corresponding to that at which the addition was cut into the bifocal mold. Thus, as shown in FIG. 1, the top edge 14 of the bifocal segment would be located a distance d down from the geometric center 16 of the lens and the center 18 of the top edge of the segment would be located a distance i in from the center 16.

The placement of the bifocal segment relative to the optical center of the distance field of a lens is normally indicated briefly in millimeters as "down" and "in", for example, 4 down and 2 in. With known casting procedures the optical center of the distance field of the plastic lens will be located at the geometric center of the circular bifocal mold. Thus if the bifocal mold is made so that the bifocal segment is positioned 4 down and 2 in from the geometric center of the mold, the bifocal segment of the lens will be positioned 4 down and 2 in from the optical center of the distance field. In FIG. 1 the optical center and geometric center 16 of the lens 10 have a common location.

However, the placement of the bifocal segment with respect to the optical center of the distance field may take many different values, such as 3 and 1, 5 and 2, etc. To provide these values, and using known techniques, bifocal molds would have to be made with all possible combinations of these figures. In addition, bifocal molds must have several overall curvatures (base curves), bifocal segments of different sizes and shapes and eleven or more segment curves for the bifocal additions. To multiply these combinations by all possible down and in values makes the total number of molds so great that prior to the present invention, the whole concept of finish casting bifocal plastic lenses was impracticable. Accordingly, a principal object of this invention is to provide means to adjust the down and in values of the bifocal segment using the same bifocal mold. One means of achieving this adjustment is to shift the optical center of the distance field away from the center of the circular mold in the manner to be described more fully hereinafter.

FIG. 2 shows another uncut bifocal lens 20 having a geometric center 16 but wherein the optical center 22 of the distance field has been shifted away from the geometric center 16. The down and in values of the bifocal segment 12 of the lens 20 are correspondingly reduced. The same bifocal mold is used to cast the lenses of FIGS. 1 and 2.

FIG. 3 illustrates a power mold generally designated 24 having an upper surface 26 and a lower convex surface 28. The convex surface 28 is accurately finished to include a spherical curvature, or if desired, a spherocylindrical curvature in a manner well known to those skilled in the art. The power mold preferably is made of glass and is transparent. It may, however, be made of a rigid plastic material or of metal. Orientation marks 30 are provided in the upper surface 26 at the periphery thereof for alignment purposes.

FIG. 4 shows a wedge member 32 made of suitable plastic, such as polytetrafluoroethylene, i.e., "Teflon" plastic, a duPont trademark. The wedge has a predetermined thickness T. As more fully described hereinafter, the wedge is used as one means of shifting the optical center of the uncut lens away from the geometrical center thereof.

FIG. 5 shows an open-ended cylindrical mold member or gasket, generally designated 34. As clearly shown in FIG. 6, the upper surface 36 of the gasket is shaped to provide a spherical or sphero-cylindrical curvature corresponding to the spherical or spherocylindrical curvature formed on convex surface 28 of power mold 24. The gasket 34 preferably is made from a resilient plastic material.

Gasket 34 is counterbored as at 38 to provide a shoulder 40 having an annular shaped planar surface and a lip 42. The planar surface of shoulder 40 is of substantially the same width as the width of wedge 32. The lip 42 of gasket 34 is of a predetermined thickness which controls the thickness of the lens produced by the mold assembly, as more fully described hereinafter. The convex surface of power mold 24 seats on the upper surface 36 of the gasket. The power mold may be allowed to shift slightly with respect to the gasket without adversely affecting the quality of the finished lens. However, if desired, the power mold may be held in fixed relation with respect to the gasket by means of lugs, not shown, mounted on the upper surface of the gasket.

FIG. 7 shows a bifocal mold 44 having a concave face 46 and a D shaped bifocal addition 48 ground into face 46. The upper perimetrical portion 50 of the bifocal mold is planar as is the outer cylindrical edge 52. Mold 44 is generally made out of glass or metal. The concave face 46 is ground and polished to a spherical curvature of a predetermined radius. The bifocal addition 48 is ground and polished to a curve of a different predetermined radius. It will be understood by those skilled in the art that the concave face 46 of the mold 44 may incorporate a curve of still a third predetermined radius which, in use, would produce a trifocal lens. The upper perimetrical portion 50 of the bifocal mold is provided with orientation marks 54 coincident with a diameter of the spherical curvature provided on concave surface 46.

FIG. 8 shows an assembly, generally designated 58, of the power mold 24, gasket 34, wedge 32 and bifocal mold 44, with a cavity 60 formed thereby which may be filled with a suitable plastic material used for forming a finished uncut bifocal lens requiring no additional grinding or polishing of the optical surfaces thereof. The assembly 58 is held together by conventional clamping means, not shown. The thermosetting plastic material used to form the lens may be injected into the cavity 60 through the gasket or filled by other suitable means.

In assembling the mold parts, power mold 24 is first oriented with respect to gasket 34. Where the convex surface 28 of the power mold is spherical, it is unnecessary to be concerned with the orientation of the power mold 24 in the gasket or with the orientation of the power mold 24 and gasket with respect to the bifocal mold. However, where the lens is to include a sphero-cylindrical or toric surface, the convex surface 28 of the power mold will include a corresponding sphero-cylindrical curvature. The sphero-cylindrical surface of power mold 24 must then be oriented with respect to the corresponding sphero-cylindrical surface formed on the upper surface 36 of the gasket 34. In addition, where the lens to be cast contains a cylindrical correction and a bifocal addition, the axis of the cylinder must be properly oriented with respect to the upper edge 56 of bifocal addition 48.

To accomplish this the power mold 24 and gasket 34 are oriented, by means of orientation marks 30, to a base reference line, not shown, in a manner well known to those skilled in the art.

The power mold 24 and gasket 34 are then oriented with respect to bifocal mold 44 by means of orientation marks 54 on the bifocal mold. It will be understood that the power mold 24 is selected so that the curvature of the surface 28 thereof (either spherical or sphero-cylindrical) corresponds to the curvature provided on the upper surface 36 of the gasket 34. A bifocal mold having the desired overall base curve and bifocal segment curve necessary to produce a lens that will meet the prescription is selected.

One of the prescription requirements that must be considered when preparing a bifocal lens is the placement of the bifocal segment. It must be oriented with respect to the cylinder axis and be placed at a prescribed distance from the optical center of the lens. In normal practice the "D" shaped bifocal segment 48 is placed so that the flat top edge 56 of the segment is aligned parallel to a horizontal diameter of the sphere surface of the convex surface of the lens. For a lens having a diameter of 65 millimeters, the center point of the flat top edge 56 is preferably spaced 8 millimeters down (vertical) and 5 millimeters in (horizontal) from the geometric center of the bifocal mold member 44, it being understood that other dimensions may be selected.

As stated above, prior to the present invention, in order to account for all of the possible positions of the bifocal segment with respect to the optical center of a finished cast lens, it would have been necessary to maintain an excessively large number of bifocal molds with the bifocal segment located at different distances from the geometric center of the mold. The present invention reduces this number by shifting the optical center of the lens away from the geometrical center of the lens.

As shown in FIG. 8, a wedge 32 of predetermined thickness has been placed between shoulder 40 of the gasket 34 and the planar upper perimetrical portion 50 of the bifocal mold. This tilts the convex face 28 of power mold 24 with respect to the opposed concave face 46 of the bifocal mold 44 by an amount adequate to shift the optical center from the geometric center of the lens by the desired amount. Since the position of the bifocal segment 48 relative to the geometric center of the bifocal mold (and of the uncut cast lens) remains the same, it will be understood that wedges of different predetermined thicknesses may be used to shift the bifocal segment with respect to the optical center of the distance field as required without necessitating a separate bifocal mold for each change in location of the bifocal segment relative to the optical center. The thickness T and placement of the wedge member 32 with respect to the 180° axis of the gasket (which may be marked on the gasket) are predetermined in order properly to shift the optical center to the desired location.

The relative dimensions of the bifocal mold and the gasket and the resilience of the gasket assure a tight fit between the two even though the wedge tilts the bifocal mold slightly with respect to the gasket by an amount equal to the thickness T of wedge member 32.

A modified form of gasket is shown in FIG. 9. Gasket 70 is "T" shaped, and the upper surface 72 of the lip 74 is shaped to fit the spherical or sphero-cylindrical curve of the convex surface 28 of power mold 24. The power mold is circular and is dimensioned so that its outer edge 75 fits snugly into the gasket and the surface 28 seats against the corresponding surface 72 of lip 74. Wedge 32 fits between the upper perimetrical edge 50 of bifocal mold 44 and the lower surface 76 of lip 74. The outer cylindrical edge 52 of the bifocal mold 44 fits snugly and seals against the counterbored wall 78 of gasket 70.

FIG. 10 shows a further modification of the gasket member and a modified form of power mold having a "derby hat" shape. Gasket member 80 has a lip 82, the upper surface 84 of which is flat. Power mold 86 has an optically ground convex spherical or sphero-cylindrical surface 88. Power mold part 86 is formed to present a plane annular surface 90 between cylindrical outer wall surface 92 and cylindrical inner wall surface 94. When inserted into gasket 80, power mold 86 makes a snug fit therewith, the outer wall surface 92 of the power mold contacting cylindrical counterbored surface 96 of gasket 80, inner wall surface 94 of the power mold contacting the innermost cylindrical surface 98 of the gasket, and the plane annular surface 90 of the power mold contacting the flat upper surface 84 of lip 82.

The derby hat form of power mold may be made in one piece or cemented together. Use of a derby hat form of power mold eliminates the necessity of shaping the gasket to a spherical or sphero-cylindrical surface because the flat upper surface 84 of lip 82 of the gasket contacts the flat annular survace 90 of the derby hat power mold.

FIG. 11 shows a further modification of the gasket utilizing the derby hat type of power mold. The upper surface 100 of gasket 102 is flat and contacts the plane annular surface of power mold 86.

An alternative form of wedge member is shown in FIGS. 12 and 13. A ring-shaped prismatic washer 104 of a predetermined cross sectional thickness at the base 106 and of reduced cross sectional thickness at apex 108 may be used in the mold assembly in place of the wedge member 32 shown in FIGS. 4 and 7 through 11. A ring-shaped washer is particularly desirable where the cross sectional thickness T of wedge member 32 is relatively large, i.e., where the optical center 22 of the distance field is moved a substantial distance from the geometric center 16 of the uncut lens 20 as shown in FIG. 2. Use of a wedge segment such as shown in FIG. 4 under these conditions may tend to cause leaks in the mold assembly.

The manner in which the thickness T of the wedge member 32 and its placement with respect to the 180° (horizontal) axis of the gaskets shown in FIGS. 5 through 11 are determined is shown in the following example.

Assume that it is desired to cast a finished uncut plastic lens having a diameter of 65 millimeters from a bifocal mold having a D-shaped bifocal segment located 8 millimeters down and 5 millimeters in. The lens is to meet the following prescription:

Rx = −1.75 + 2.25 × 21° O.D. 2.25 D segment addition located 4 millimeters down and 2 millimeters in from the optical center.

In this prescription

| | |
|---|---|
| −1.75 | designates a spherical power of 1.75 diopters; |
| +2.25 | designates a cylindrical power of 2.25 diopters; |
| 21° | designates the axis of the cylinder with respect to the 180° (horizontal) axis; |
| OD | designates the right eye; and |
| 2.25 D segment | designates a bifocal segment of D shape having a spherical power of 2.25 diopters. The upper edge of the D segment is to be located 4 millimeters down from the optical center of the lens and the midpoint of the upper edge of the segment is to be 2 millimeters in or toward the nose from the optical center. |

Referring to FIG. 14, and using terminology known to those skilled in the art in calculating corrective prism, C represents the geometric or mechanical center of the circular bifocal mold 44. Without any prism the optical center of a lens cast in a mold assembly of the type described would also be at C and the D-shaped bifocal segment would be 8 down and 5 in. In order to meet the prescription, however, the segment must be 4 down and 2 in from the optical center. Thus the optical center must be shifted 4 down and 3 in from the geometric center C to point O as shown in FIG. 14. To determine the amount of prism required to move the optical center 4 down and 3 in (CD and OD, respectively, in FIG. 14), the following calculations are made:

To get the prismatic effect of the cylinder at C

From FIG. 14 CF is a perpendicular drawn from C to the cylinder axis which is established by the prescription as being 21° with respect to the horizontal.

In triangle ODE

```
OD    = 3 mm
<DOE  = 21°
DE    = 3 × tan 21° = 3 × .38 = 1.15 mm
```

In triangle CFE

```
CE = CD + DE = 4 + 1.15 = 5.15 mm
CF = 5.15 × cos. 21 = 4.81 mm = .48 cm
```

It is known that the amount of prism at any point on a lens, in prism diopters, is equal to the power of the lens in diopters multiplied by the distance of the point from the optical center of the lens in centimeters. Therefore, at point C, the prismatic effect of the cylinder power is obtained by multiplying the distance CF by the power of the cylinder. From FIG. 14

| | |
|---|---|
| Δ cylinder | = CF × cylinder power = .48 × 2.25 = 1.08 down and in at 111° |
| (Δ cylinder) horizontal | = 1.08 × cos (90°−21°) = 1.08 × .358 = .38 cm in |
| (Δ cylinder) vertical | = 1.08 × cos 21° = 1.08 × .935 = 1.00 cm down | where Δ is the prismatic effect of prism power.

To get the prismatic effect of the sphere at C

The prismatic effect of the spherical power at point C is obtained by multiplying the distance CO by the power of the sphere. Therefore, from FIG. 14:

$$CO = \sqrt{0.4^2 + 0.3^2} = 0.5 \text{ cm}$$

| | |
|---|---|
| Δ spherical | = CO × spherical power = CO × 1.75 = .5 × 1.75 = .88 with the direction up and out |

The angle of the axis of the prism is angle OCD in FIG. 14.

$$<OCD = \tan^{-1} \tfrac{3}{4} = 36° 52'$$

| | |
|---|---|
| (Δ spherical) horizontal | = .88 × sin 36° 52' = .53 cm out |
| (Δ spherical) vertical | = .88 × cos 36° 52' = .70 cm up |

The sum of the prismatic effects is

| | | |
|---|---|---|
| (Δ cylinder) horizontal | = | .38 in |
| (Δ spherical) horizontal | = | .53 out |
| Total | = | .14 out |
| (Δ cylinder) vertical | = | 1.00 down |
| (Δ spherical) vertical | = | .70 up |
| Total | | .30 down |

Figure 15:
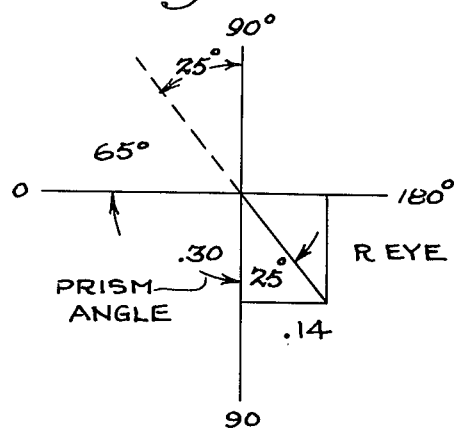
FIG. 15 is a diagram used to illustrate the manner in which the thickness and placement of a wedge member is used in connection with the present invention.

Referring to FIG. 15, to get the total prismatic effect and the thickness and placement of the wedge member:

$$\text{Total prism} = \sqrt{.30^2 + .14^2} = .33 \text{ cm}$$

Angle of prism to vertical = tan⁻¹ .14/.30 = .466 = 25°

Using standard ophthalmic notation (looking at the lens toward the concave surface), the prism angle would be taken as 65° from the horizontal. Wedge to produce this prism must be set down and out at 65°. To get the thickness of the wedge for a lens having a diameter of 65 millimeters, standard formula may be used, as follows:

$$\text{Thickness difference} = \frac{\text{desired prism} \times \text{diameter}}{100(n-1)}$$

where $n$ is the refractive index of the lens material. Thus, for a plastic where $n = 1.4985$ $$\text{Thickness difference} = \frac{.33 \times 65}{100(1.4985-1)} = \frac{.33 \times 65}{49.85}$$

$$= 43 \text{ mm} = .017 \text{ inches}$$

Since one side of the wedge is considered to have a thickness of zero, the thickness difference becomes the thickness of the wedge or shim.

Thus in order to move the optical center of the lens from point C to point O, i.e., 4 millimeters down and 3 millimeters in, a wedge 32 having a thickness T of 0.43 millimeters must be placed at an angle of 65° down and out from the horizontal.

As will be understood by those skilled in the art, the thickness and placement of a wedge necessary to meet different prescription requirements may be calculated and suitable charts showing these values may be prepared.

As stated above, terminology for calculating corrective prism has been used in the above example. After an uncut lens such as illustrated in FIG. 2 is edged and put in a frame to be worn by the patient, the optical center 22 will be positioned on the directly forward line of sight of the wearer and there is no deviation of a ray of light at this point, i.e., there is no prism. Occasionally, however, due to muscular abnormalities of the eye, the doctor will prescribe a prism which is to apply for the directly forward line of sight. The corrective prism may be introduced into the cast plastic lens using the present invention by adjusting the thickness of the wedge.

Figure 16:
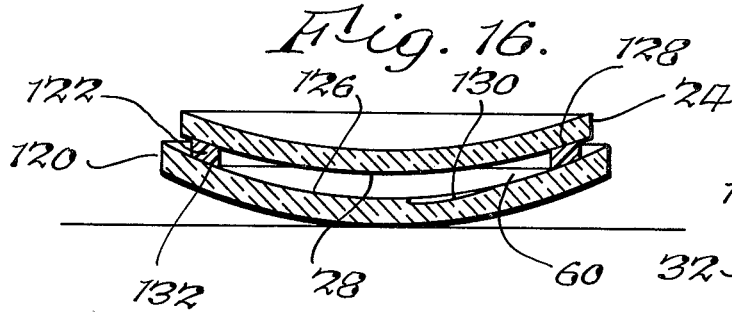
FIGS. 16 through 19 are vertical sectional views showing further modified forms of gasket and bifocal molds.

FIGS. 3 through 11 show one means of shifting the location of the bifocal segment relative to the optical center of the distance field, namely, by use of a wedge member 32 or a ring-shaped prismatic washer 104. An alternative means of accomplishing a like result will now be described. Referring to FIG. 16, circular bifocal mold 120 has a diameter larger than the outside diameter of cylindrically-shaped gasket member 122. The lower surface 132 of gasket 122 is ground to the same but opposite curvature as the concave upper surface 126 of bifocal mold 120. The upper surface 128 of the gasket is ground to conform to the lower convex surface 28 of power mold 24. The bifocal mold 120 is of sufficiently large diameter relative to the diameter of gasket 122 to permit the gasket to be slid around on the bifocal mold to locate the bifocal segment 130 relative to the optical center of the distance field as desired. With the power mold, gasket and bifocal mold properly positioned, the assembly is clamped together and a thermosetting plastic may be injected into the cavity 60 as previously described.

Figure 17:
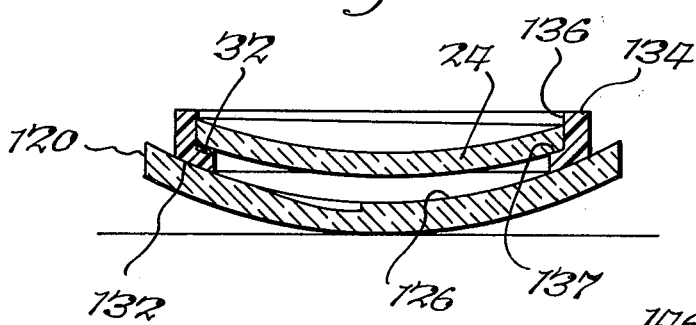

FIG. 17 shows how a wedge member 32 of the type previously described may be used to introduce additional prism into a lens, using a power mold 24, a sliding gasket 134, and an oversized bifocal mold 120. The lower surface 132 of gasket 134 is ground to conform to the concave surface 126 of bifocal mold 120. Gasket 134 is counterbored as at 136 to a size that will form a tight fit with power mold 24. The shoulder 137 of gasket 134 is ground to conform to the convex surface of power mold 24.

Figure 18:
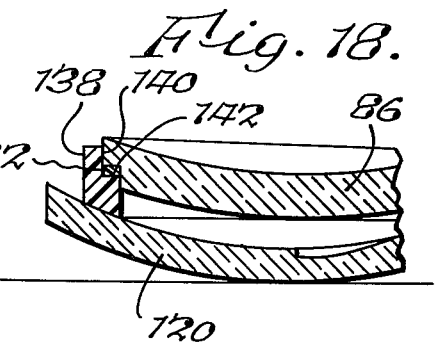
Figure 19:
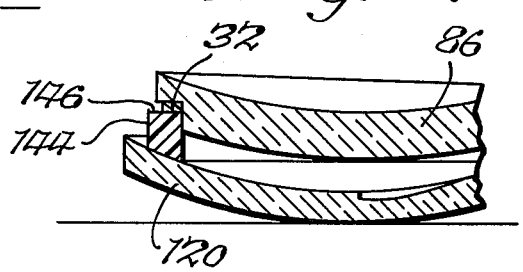

Further modifications are shown in FIGS. 18 and 19, the former showing a derby hat type of power mold 86 used with a wedge 32, sliding gasket 138 and oversized bifocal mold 120. Gasket 138 is counterbored as at 140 to present a plane annular surface 142 to accept the power mold 86 and wedge 32. FIG. 19 shows a derby hat power mold 86, wedge 32, a simplified gasket 144 having a plane annular upper surface 146 and oversized bifocal mold 120.

It will be understood that in each of the modifications shown in FIGS. 17 through 19 the gasket is slid to position the bifocal segment relative to the optical center of the distance field. Additional prism may be added to the lens in the as cast state by using a wedge 32. The thickness and position of the wedge are calculated as previously described.

The terms and expressions which have been used are terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Apparatus for casting a multifocal plastic lens comprising
   a power mold adapted to form a first surface of said lens,
   a multifocal mold adapted to form a second opposing surface of said lens, said multifocal mold being shaped to form a reading segment in said second opposing surface at a predetermined distance from the geometric center of said multifocal mold,
   a gasket for supporting said power and multifocal molds in spaced apart relationship whereby a lens may be formed having a distance field of a first diopter power and a reading segment of a second diopter power and whereby said distance field has an optical center,
   and means for adjusting the position of said reading segment relative to said optical center.

2. Apparatus according to claim 1 wherein said multifocal mold is a bifocal mold.

3. Apparatus according to claim 1 wherein said power mold is curved to form a first surface having a spherical curvature.

4. Apparatus according to claim 1 wherein said power mold is curved to form a first surface having a sphero-cylindrical surface.

5. Apparatus according to claim 1 wherein said reading segment is D-shaped.

6. Apparatus according to claim 1 wherein said position adjusting means comprises a wedge member of predetermined thickness.

7. Apparatus according to claim 1 wherein said position adjusting means is a ring-shaped prismatic washer of predetermined thickness at its base and a reduced thickness at its apex.

8. Apparatus according to claim 6 wherein said wedge member is positioned between said gasket and said multifocal mold.

9. Apparatus according to claim 1 wherein said power mold has a convex face of predetermined curvature and said gasket has a surface of the same but opposite curvature adapted to seat said convex face in sealing relationship.

10. Apparatus according to claim 1 wherein the perimetrical portion of said power mold has a plane annular surface and said gasket has a corresponding surface adapted to receive said portion in sealing relationship.

11. Apparatus according to claim 1 further comprising means to add corrective prism to said lens.

12. Apparatus for casting a multifocal plastic lens comprising
   a power mold adapted to form a first surface of said lens,
   a circular multifocal mold adapted to form a second opposing surface of said lens, said multifocal mold being shaped to form a reading segment is said second opposing surface at a predetermined distance from the geometric center of said multifocal mold,
   a cylindrical gasket for supporting said power and multifocal molds in spaced apart relationship whereby a lens may be formed having a distance field of a first diopter power and a reading segment of a second diopter power and whereby said distance field has an optical center,
   said multifocal mold having a diameter greater than the diameter of said gasket and adapted to slidingly engage said gasket in sealing relationship whereby on sliding movement of said gasket relative to said multifocal mold the position of said reading segment relative to said optical center may be adjusted.

13. Apparatus accoding to claim 12 further comprising means to add corrective prism to said lens.

14. Apparatus according to claim 13 wherein said corrective prism adding means is a wedge member of predetermined thickness positioned between said first annular surface of said gasket and said rim portion of said power mold.

15. Apparatus according to claim 13 wherein said corrective prism adding means is a ring-shaped prismatic washer of predetermined thickness at its base and a reduced thickness at its apex.

16. Apparatus according to claim 12 wherein said power mold has an optically curved convex surface formed with a spherical base.

17. Apparatus according to claim 12 wherein said power mold has an optically curved convex surface formed with a spherical base having a cylinder imposed thereon whereby a lens molded in said apparatus will have cylinder correction.

18. Apparatus according to claim 12 wherein said multifocal mold is a bifocal mold and said multifocal lens is a bifocal lens.

19. Apparatus for casting a multifocal plastic lens comprising:
   a power mold having an optically curved convex surface adapted to form one surface of a lens,
   a multifocal mold having a first optically curved concave surface adapted to form an opposing convex surface of the same lens, said multifocal mold having a second optically curved segment countersunk in said first optically curved concave surface a predetermined distance from the geometric center of said first concave surface,
   a cylindrical gasket for holding said mold parts in spaced apart relationship with the convex surface of said power mold facing the first and second concave surfaces of said multifocal mold whereby a lens may be formed having a distance field of a first diopter power and a reading segment of a second diopter power and whereby said distance field has an optical center,
   said power mold having a rim portion and said gasket having a first and second annular surface, said first annular surface shaped to conform to the rim portion of said power mold and said second annular surface shaped to conform to said first concave surface of said multifocal mold,
   means to engage the power mold in a fixed predetermined axial relationship with respect to said gasket,
   the first concave surface of said multifocal mold having a diameter larger than the diameter of said gasket and adapted to slidingly engage the second annular surface of said gasket in sealing relationship whereby said gasket and said power mold in said fixed predetermined axial relationship may be slidingly moved relative to the geometric center of said first concave surface to place said reading segment in a predetermined position relative to said optical center of said distance field.

20. Apparatus according to claim 19 further comprising means to add corrective prism to said lens.

21. Apparatus according to claim 20 wherein said corrective prism adding means is a wedge member of predetermined thickness positioned between said first annular surface of said gasket and said rim portion of said power mold.

22. Apparatus according to claim 20 wherein said corrective prism adding means is a ring-shaped prismatic washer of predetermined thickness at its base and a reduced thickness at its apex.

23. Apparatus according to claim 19 wherein the optically curved convex surface of said power mold has a spherical base.

24. Apparatus according to claim 23 wherein the spherical base has a cylinder imposed thereon whereby a lens molded in said apparatus will have a cylinder correction.

25. Apparatus according to claim 19 wherein said multifocal mold is a bifocal mold and said multifocal lens is a bifocal lens.

26. Apparatus according to claim 19 wherein the rim portion of said power mold and the first annular surface of said gasket are planar.

* * * * *